Dec. 26, 1944.　　　S. BELFER　　　2,365,997
MAIZE HARVESTER
Filed Oct. 22, 1941　　　3 Sheets-Sheet 1

Inventor
Simon Belfer
By Fraser, Myers & Manley
His Attorneys

Dec. 26, 1944.     S. BELFER     2,365,997

MAIZE HARVESTER

Filed Oct. 22, 1941     3 Sheets-Sheet 2

Inventor

Simon Belfer

By Fraser, Myers & Manley his Attorneys

Dec. 26, 1944.   S. BELFER   2,365,997
MAIZE HARVESTER
Filed Oct. 22, 1941   3 Sheets-Sheet 3

Inventor
Simon Belfer
By Fraser, Myers & Manley
his Attorneys

Patented Dec. 26, 1944

2,365,997

UNITED STATES PATENT OFFICE 2,365,997

MAIZE HARVESTER

Simon Belfer, Buenos Aires, Argentina

Application October 22, 1941, Serial No. 416,043

15 Claims. (Cl. 56—64)

The present invention relates to harvesting machines and particularly to maize harvesting machines.

In designing machines for harvesting maize, attention must be particularly paid to certain factors arising out of the peculiar nature of the plant. Maize plants have a relatively long and thick stem, on which the cobs are seated at intervals. The corn is enveloped in the husk which must eventually be stripped off. The plants must be cut, guided into the machine, passed therethrough to separate cobs from the stems and preferably also strip the husk, the stems must be discharged and the cobs collected. One difficulty usually encountered in guiding the plants into the machine, or more properly speaking, arranging the machine so that in its passage through the cornfield it will so position the standing corn that the operative parts of the machine may perform their functions readily and efficiently, is that the plants are frequently bent and tangled, and that owing to the natural arrangements of the cobs on the stems, the stems must be passed through the stripping rollers after cutting with their butt ends first. If the plants are presented to the stripping rollers in their tangled condition, or if a bundle of plants is so presented, the rollers tend to become choked, and such choking may give rise to fracture of a machine part. Apart from such fracture, the choking or clogging of the machine entails a very troublesome and time-consuming clearing operation.

Heretofore machines have been proposed comprising devices of various kinds adapted to overcome some or all of the aforementioned difficulties, but the machines of the prior art have not proved entirely satisfactory, particularly with respect to the manner in which the cut plants are conveyed to the strippers and the construction and operation of the strippers.

According to the present invention the aforesaid difficulties are overcome in a simple and efficient manner by providing in the machine improved conveying and stripping means, said conveying means comprising a pair of endless conveyor means arranged in parallel opposed relationship lengthwise of an inclined frame to define a relatively narrow passage extending in the plane of the standing corn, said conveyor means being provided with resilient gripper means arranged at spaced intervals cross-wise of the conveyor means the gripper means of the one conveying means being adapted to cooperate with the gripper means of the other conveying means, in said passage to firmly and yieldingly grip the stems of the plants to convey them to the stripper means located at the rear end of said frame, the machine being further provided with inverting means for turning the plants so that their butts shall be directed toward the stripper means.

The inverting means comprises a check bar positioned preferably adjustably near the forward end of said passage and transversely thereof on the side remote thereof from the ground. According to the present invention the improved stripper means comprises a stripper assembly located to the rear of the rear end of the conveying means and including pairs of stripper rolls, each roll of a pair consisting of a body portion preferably having a plurality of rings of outwardly projecting teeth, spaced lengthwise of the body portion, the rings of one roll of a pair being staggered with respect to those of the other roll, so that in the assembled condition the teeth of one member of the pair project into the spaces between the rings of teeth of the other member. Preferably I provide two pairs of stripper rolls arranged in side by side relationship, the axes of the rolls being substantially parallel to the central longitudinal vertical plane of the narrow passage defined by the conveying means. The row of four rolls thus extends crosswise of the frame, and the pairs may be positioned so close together that the rings of teeth of the two inner rolls one of which belongs to one pair and the other to the other pair penetrate into the spaces between the rings of the other of said inner rolls. All four rolls may be positively coupled together as by gear wheels, to rotate simultaneously, the arrangement being such that the members of each pair move in the zone of interpenetration of their rings of teeth in the same direction as the conveying means in said passage, whereby the stripper rolls of each pair are adapted to seize the butts of the plant stems fed to them and positively drive the plants out of the rear end of the frame whilst stripping the cobs from the stems.

The stripper assembly also includes a cob discharging roll mounted crosswise of the frame close to the lower ends of the stripper rolls, and constructed of a yielding material. Said cob discharging roll is positively driven so that the portion of its surface adjacent the stripper rolls, moves downwardly past them, whereby the cobs as they fall onto the cob discharging roll after being detached from the stems by the stripper roll are positively discharged in a downward direction, while being brought into yielding contact with the lower portion of the stripper rolls. The purpose of this is to ensure as far as possible, that any cobs which have not been dehusked simultaneously with the stripping operation, may have their husks removed whilst being positively discharged as stated above.

I have found it desirable though not indispensable to provide just forwardly of the zone of proximity of the inner rolls of the pairs of stripper rolls, a diverting member mounted for free rotation, and adapted on being struck by a plant stem moving towards said zone of proximity, to divert the stem to the zone of interpenetration of one or other of the pairs of stripper rolls. The improved harvester of the present invention also comprises driving means for the several parts and cob collecting means, including elevator means and hopper means. Preferably the hopper means is provided with final dehusking rollers arranged in side by side parallel relationship to form an inclined path directed towards the discharge outlet of the hopper means.

These and other features and advantages of the present invention will become more readily apparent in the course of the following detailed description of a preferred embodiment illustrated in the accompanying drawings in which.

Figure 1:
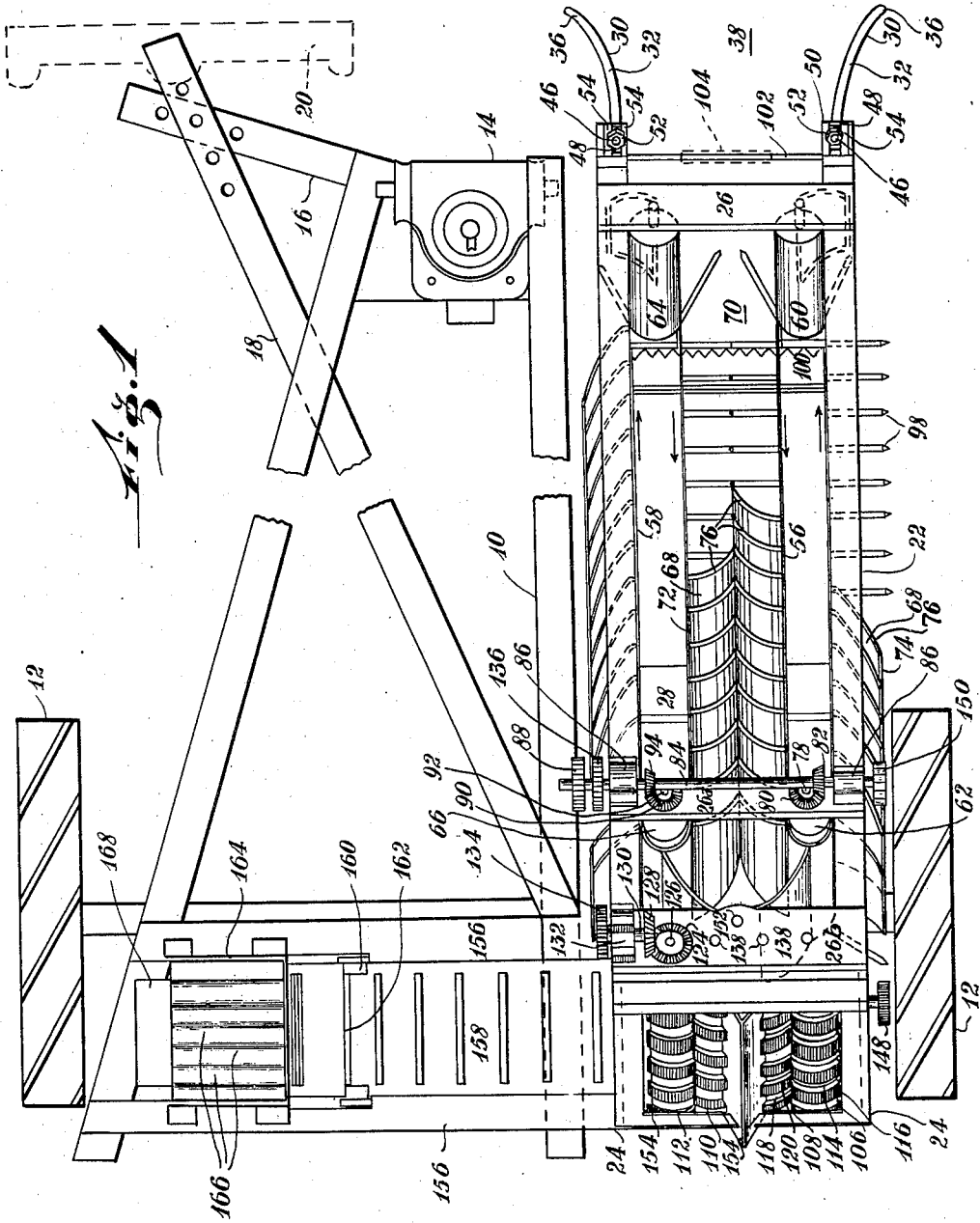
Fig. 1 is a plan view of a maize harvester according to the present invention.
Figure 2:
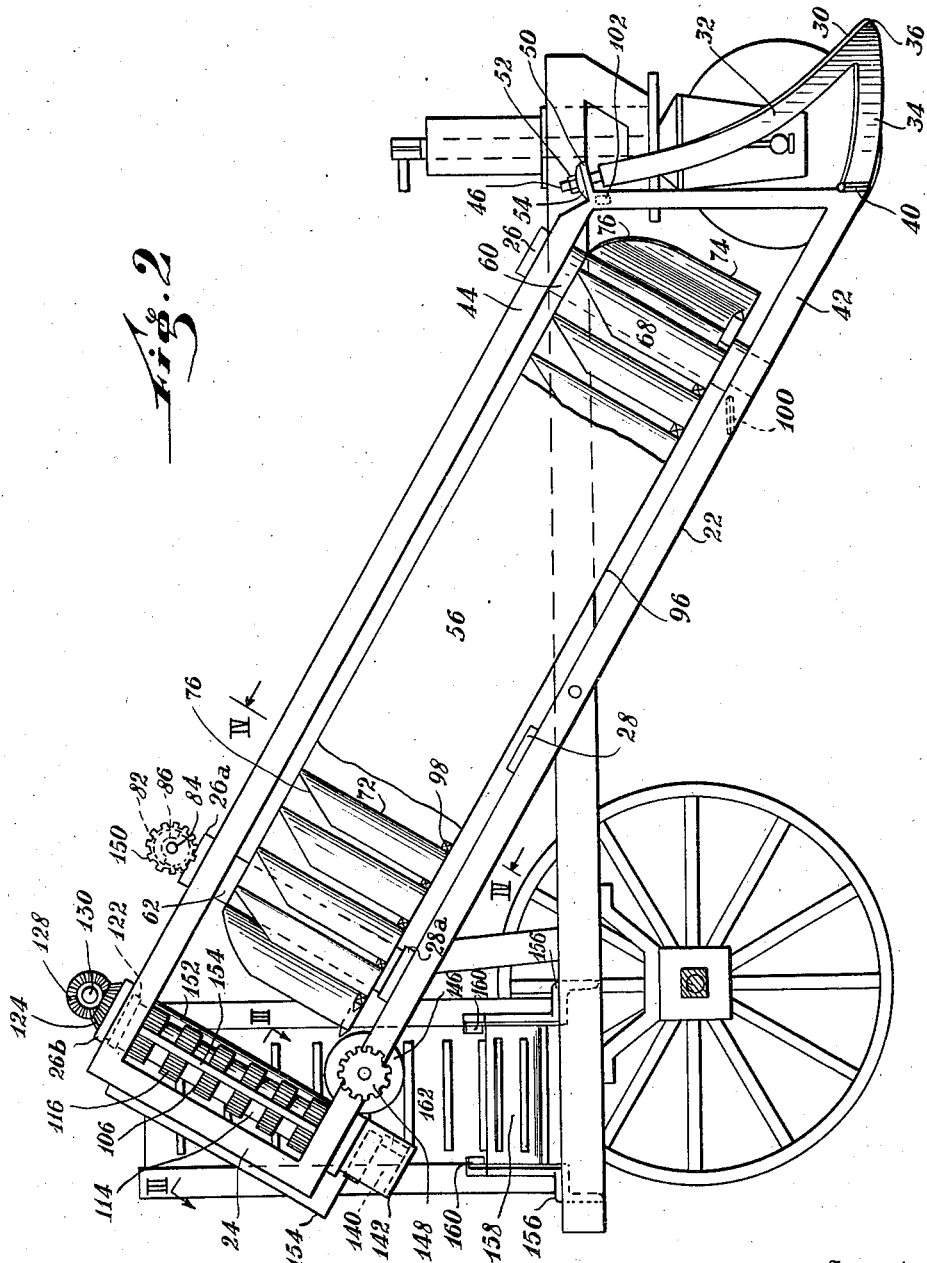
Fig. 2 is a side elevation thereof.
Figure 3:
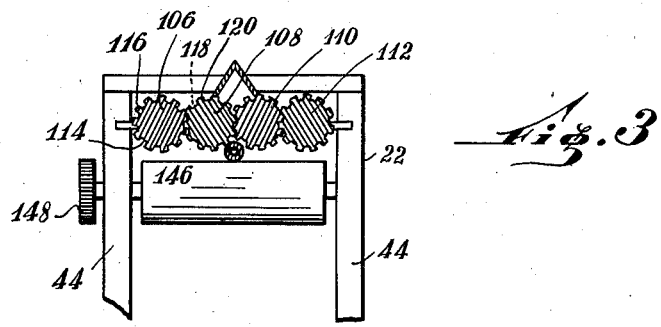
Fig. 3 is a section on the line III—III of Fig. 2.
Figure 4:
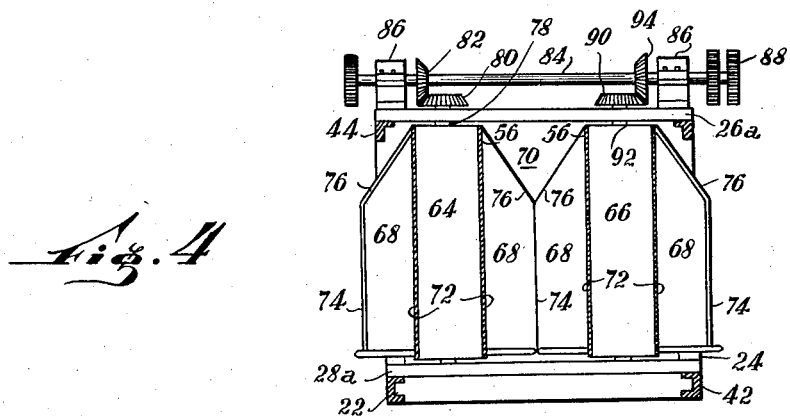
Fig. 4 is a section on the line IV—IV of Fig. 2.
Figure 5:
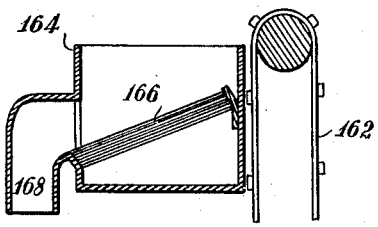
Fig. 5 is a section on the line V—V of Fig. 1.

As shown in the drawings the improved maize harvester of the present invention comprises a chassis structure indicated by the general reference 10, to which a pair of rear wheels 12 and a front steering wheel assembly 14 are mounted in the usual manner, a description of which is deemed unnecessary. As illustrated, the chassis likewise comprises an offset member 16 and a tie member 18 crossing the offset member at the forward end of the machine to provide attachment points for a drawbar 20 to which a team of horses may be hitched. This arrangement is merely illustrative since obviously the harvester as a whole may be propelled by other means. For example it may incorporate a propulsion motor operatively coupled to the rear wheels 12, or it may so be disposed that the animal traction team pulls the harvester from the rear instead of from the front. As all such arrangements are generally well known and do not affect the nature of the improvements which are the subject matter of the present invention, no further or detailed description thereof is deemed necessary.

Mounted on one side of the chassis structure 10 is an inclined frame 22 composed of a pair of substantially parallel side frames 24 secured together in spaced relationship by a plurality of upper and lower tie members 26, 28 respectively. The frame slopes upwardly and rearwardly at an appreciable angle as for example 30°, and has attached to its forward end, that is to say, the end nearest the steering wheel assembly 14, a plant lifter device 30, consisting of a forwardly concave riser 32 an end of which meets a ground member 34 to form a nose 36. Preferably I provide a plant lifter device for each side frame 22, 24, and said plant lifter devices are bent outwardly of said frame to define a relatively wide entrance 38.

To prevent stubbing of the plant lifters into the ground on meeting a rising irregularity, and to permit them to ride over such irregularities, the lower edge of the nose 36 is made convex and directed upwardly and the ground member is hinged as shown at 40 to the forward end of the lower side frame member 42. The concave riser 32 is adjustably secured to the forward end of the upper side frame member 44 as by means of a threaded pin 46 integral with said riser 32 and passing through a slot 48 in a plate-like extension 50 of the upper side frame member 44, said pin being adapted to receive a nut 52 resting on a pair of arcuate shoulders 54 formed on either side of the said slot on the side of said extension remote from said riser. Mounted in the frame 22 is the plant gripper and conveying means which as shown consists of a pair of endless belts 56, 58, adapted to be driven around forward and rear pulleys 60, 62 and 64, 66 respectively.

Each belt is adapted to be positively driven by one of the pulleys, preferably the rear pulley, which is therefore provided with suitable driving means. Thus the belt 56 is, as shown, arranged to be driven by the rear pulley 62 which is for this purpose fast on a shaft 78 journalled in upper and lower cross plates 26a, 28a of the frame 22. The upper end of the shaft 78 extends beyond the cross plate 26a to receive a conical gear 80 meshing with a conical gear 82 fast on a transmission shaft 84 rotatably mounted crosswise of the frame in bearing blocks 86. At one end, for example, the end overhanging the chassis 10, the transmission shaft has secured to it a driving means, such as a chain wheel 88 adapted to be connected to a suitable source of energy, not specifically shown in the drawings. The arrangement is such that the belt 56 is driven so that the portion defining the passage 70 moves rearwardly of the frame 22. In Fig. 1 the belt 56 would move counterclock-wise. The driving arrangement for the other belt 58 is exactly similar, the cone gear 90 on the shaft 92 of the pulley 66 meshing with the cone gear 94 fast on the transmission shaft 84. The belt 58 is adapted to be driven so that the portion thereof defining the passage 70 moves in the same direction as the corresponding portion of the belt 56, i. e., the belt 58 moves clock-wise in Fig. 1.

Each of the belts 56, 58, has projecting laterally from it a plurality of gripper members 68 of curved cross-sections so arranged that in the passage 70 defined by the two adjacent portions of the opposite belts, the concave side of the gripper members faces towards the entrance 38.

The gripper members may be constructed with their free edges parallel to the edges 72 anchored to the respective belts, but in order to allow the upper portion of a plant to enter between the gripper members I prefer to cut back the upper portion of the gripper member so that the free edge of each such member comprises a lower portion 74 parallel to the anchored edge 72 and an upper inclined portion 76, sloping upwardly and outwardly when the gripper members are located in the passage 70.

The two belts 56, 58, are spaced width-wise of the frame 22 so that in said passage 70 the lower portions 74 of the free edges of the gripper members on the adjacent portions belonging to different belts shall be in gripping engagement, the contact between cooperating gripper members occurring on their convex faces. The gripper members, or at least their free edge portions are made of a resilient material, such as vulcanized rubber, with sufficient stiffness to afford a firm but yielding grip on the plant stems in said passage 70.

In order to positively guide the lower portions of the plants, while the machine is moving past them, and to provide a positive thrust rearwardly of the machine against the plants to facilitate the cutting operation described below as well as to form a grid bed or floor between the adjacent portions of opposite belts in the passage 70, on which the severed lower ends of the stems may be supported, I provide along the lower edge 96, of the belts 56, 58, a plurality of laterally projecting relatively rigid arms 98 disposed between each successive pair of gripper members.

A short distance to the rear of the forward pulleys 60, 64, I provide a cutter 100 disposed crosswise between the lower side members 42 of the frame 22.

The cutter 100, which is adapted to be actuated in the usual manner with the aid of operating means of any of the usual types (not shown), is so positioned with respect to the passage 70, that the plants may be firmly gripped by the gripper members 68 before the stem is severed from the root by the cutter 100.

As already stated I provide inverting means for turning the plants so that the butt ends shall be the leading ends during the travel of the plants along the passage 70. Said inversion means comprises a check bar 102, arranged crosswise of the frame at the forward end thereof between the upper side members 44. The check bar should be so positioned with respect to the conveyor means that the upper portion of a plant would engage the check bar before the lower portion of the plant is seized by the gripper member. Although I have shown the check bar as a plain bar fixedly mounted to the frame, I may arrange for adjustable mounting thereof so as to allow the setting of the bar to be altered to correspond to varying general heights of growth of plants in different cornfields. I may also provide a sleeve, a portion of which is indicated in dotted lines at 104 in Fig. 1, such sleeve being mounted for free rotation around the check bar, which would then of course be in the form of an inner rod, such sleeve will provide for smoother passage and readier deflection of the upper portion of the plants.

Mounted rearwardly of the conveyor and gripping means is a stripper assembly, comprising two pairs of stripper rolls 106, 108 and 110, 112. Since both pairs are of similar construction only the pair 106, 108 will be described in detail. The roll 106 has a body portion 114 having a plurality of circumferential rings of teeth 116, spaced lengthwise of the body portion, said rings being of slightly greater diameter than the body portion 114. The cooperating roll 108 is similarly composed of a body portion 118 having a plurality of circumferential rings of teeth 120 which are arranged in staggered relationship with respect to the rings 116 of the roll 106, so that in the assembled condition, the teeth of the one roll project into the spaces between the rings of teeth of the other roll. At one end, for example the upper end, each stripper roll has fast on it a gear 122 and said gears are adapted to mesh so as to provide for positively and simultaneously driving all four rolls, as by means of a cone gear 124 mounted on the shaft 126 of the roll 112 and meshing with a cone gear 128 mounted on a driven shaft 130 journalled in a bearing 132 secured to an upper side member 44 of the frame 22. Said driven shaft 130 has on its other end a chain wheel 134 adapted to be driven as from a chain wheel 136 mounted on a corresponding end of the transmission shaft 84.

The stripper rolls have shafts 126, 138, the upper ends of which are journalled in a cross plate 26b, and the lower ends of which are journalled in footstep bearings 140 mounted in a supporting strap 142 fixedly secured to the lower side members of the frame 22.

Between the conveying means and the stripper rolls I provide a cob discharging roll 146 of a yielding material, mounted for rotation in close proximity to the stripper rolls and transversely of the frame 22 between the lower side members 42 thereof, and adapted to be driven as by a chain wheel 148, for example from a chain wheel 150 fixed on the transmission shaft 84. To prevent plant stems from attempting to pass between the inner rolls 108 and 110 of the two pairs of stripper rolls, I provide a diverting member 152, which, as shown, consists of a smooth cylindrical roller of relatively small diameter mounted for free rotation just forward of the zone of proximity of said inner rolls 108 and 110 and parallel to said rolls.

The pairs of stripper rolls are arranged to be driven so that over the zone of interpenetration of the teeth, the surfaces of the rolls composing the pair, move in the same direction as the conveying belts 56, 58 in the passage 70 a plant stem is presented to the stripper rolls, the teeth thereof will grip the stem and draw it from between the gripper members 68 to expel the stem from the rear end of the machine whilst stripping the cobs therefrom.

To prevent clogging of the stripper assembly, I provide cleaning combs 154 conveniently disposed, the teeth of said combs being adapted to extend between the rings of said teeth of the stripper rolls.

Mounted below the stripper assembly and extending between the parallel cross members 156 of the chassis 10, is a portion of an elevator 158 forming a horizontal run, said elevator belt being then guided as by rollers 160 to provide an upwardly inclined portion or run 162, adapted to deliver the stripped cobs to a hopper or collecting device 164. The elevator may be driven independently of the drive for the conveyor and its associated parts, by any suitable means, not shown, or it may be operatively coupled to the transmission shaft 84.

To allow of a final de-husking operation and thus take care of any cobs which, by reason of their excessively small size or the unusual toughness of the husk, have not been de-husked by the stripper assembly or the cob discharging roll, I provide in the hopper 164 a plurality of parallel rolls 166 arranged in contacting relationship to form an inclined path directed towards the discharge 168 of the hopper. The said rolls 166 are adapted to be positively driven, in a manner not shown and have their surfaces roughened as by striation, grooving or the like, to enable them to tear off the husks of any cobs which have failed to be de-husked previously while the cobs are passing through the hopper.

The harvester is adapted to be propelled over the cornfield with the plant lifters in adjacent furrows and the center line of the passage 70 coinciding substantially with the center line of a ridge. As the machine advances fallen plants are raised by the plant lifters and standing plants enter the machine together with the lifted plants through the entrance 38 until they come within gripping reach of the moving gripping members 68 in the passage 70. As previously explained the check bar 102 pushes the upper portion of the plant which has engaged it in the direction of the advance of the machine so that the gripper members seize the lower portion of the plant. As the machine continues to advance the cutter 100 reaches the base of the plant and severs it from the root. This operation is facilitated by the arms 98, a pair of which will have met back of the plant at the time when the lower portion of the plant is seized by the gripper members. Thus when the stem has been severed, the butt is supported by said pair of arms while the immediately neighbouring portion of the plant is still held by the gripper members 68, which are now able to convey the plant stem away from the ground towards the stripper assembly. The upper portion of the plant which has been deflected by the check bar 102, will rest in the roughly V shape gap between the upper inclined edge portion 76 of the cooperating pair of gripper members 68. In this manner the stems are presented butt first to the stripper assembly.

Owing to the particular construction described of the stripper rolls, these are enabled to seize the plant more readily and exert a more positive ejecting thrust therein without involving excessive crushing of the stem as has been the practice in prior art machines, in which the stripper rolls have been striated cylinders or provided with screw threads or the like. Such crushing of the whole stem section is undesirable since it calls for an excessive amount of power, and is liable to produce slippage of the rolls and consequent choking of the machine.

As the stems are positively ejected through the stripper rolls, the cobs are stripped off and in general husked at the same time. The stripped cobs fall onto the cob discharging roll 146, and since this is driven so that its upper portion rotates towards the stripper rolls, the cob discharging roll acts to force the cobs downwardly between itself and the stripper rolls. The cob discharging roll as has been stated, is made of a relatively yielding material. For example, it may be made with a relatively thick outer layer of soft or spongy rubber, or it may consist of a brush with relatively closely set stiff bristles. Owing to the yielding nature of the operating surface of the cob discharging roll, the cobs are yieldingly pressed against the lower part of the stripper assembly and tend to bury themselves in the yielding surface of the discharging roll. Then, when de-husked cobs are being discharged, as will generally be the case, the stripper rolls will not during such discharge injure the cobs, owing to the resilient nature of the grains of corn. On the other hand, when cobs still having the husk or a portion thereof enveloping the same, pass between the discharge roll and the stripper rolls, the latter will seize the fibrous husk and strip it. Owing to the varying sizes of cobs, the separation between the operative surfaces of the gripper assembly and the discharge roll should be very small, and this requirement calls for the use of a yielding material for operative portions of the discharge roll.

After leaving the discharge roll 146, the cobs drop onto the lower run 158 of the elevator and are carried by it to the hopper 164. From the upper run 162 of the elevator the cobs drop onto the rollers 166 and slide along these towards the discharge 168 where they may be collected into a bag. In passing along the inclined path formed by the rollers 166, the cobs are subjected to a rotary scrubbing action by said rollers, whereby although de-husked cobs are not injured, any cobs which may still have escaped de-husking may have the husk removed by the action of said rollers.

Although the present invention has been described with reference to a specific embodiment thereof, I do not intend to be limited thereby as it is possible to make a number of changes and modifications in the construction without departing from the spirit and nature of the invention. For example I may provide more than one pair of conveyor and gripping means, and instead of mounting the gripping members onto a belt, I may mount them between upper and lower chains and the like, in which event the forward and rear pulleys would be replaced by more appropriate driving means, as example, chain wheels.

I prefer to make the gripper members entirely of rubber composition, and preferably so that the free edges thereof adapted to exert the gripping effect, are slightly more flexible than the anchored edges. However, the gripper members may be of other materials and may be of a composite structure. Thus the root or anchored portion may be made of a substantially rigid material, such as wood or metal, to which a flexible material such as a vulcanized rubber composition may be secured to form the free gripping edge or area. These and other similar modifications are held to lie within the scope of the present invention as defined in the accompanying claims.

I claim:

1. A maize harvesting machine comprising a chassis having a rear end and a forward end, an inclined frame-work secured to one side of the chassis in a rearwardly and upwardly sloping position with respect to said chassis, plant conveyor and stripping means including cob discharging means mounted in said frame, said conveyor means comprising a plurality of gripper means of curved cross-section mounted in parallel spaced relationship on a positively driven endless carrier extending length-wise of said frame and having an inner portion and an outer portion, a second plurality of gripper means of curved cross-section mounted in parallel spaced relationship on a second positively driven endless carrier member extending length-wise of the frame and having inner and outer portions disposed parallel to the inner and outer portions of the first carrier member, the inner portions of the two carrier members being spaced widthwise of the frame to define a passage and being adapted to move rearwardly of the harvester in said passage, said gripper members being arranged so that in said passage their concave sides face forwardly, and their edges remote from the carrier members are in plant gripping relationship, a stripper assembly arranged in the frame rearwardly of said passage and comprising two pairs of stripper rolls, said stripper rolls including a body portion and a plurality of circumferential rings of teeth of diameter larger than said body portion, said rings of teeth being arranged in spaced relationship along said body portion, the stripper rolls of a pair being disposed in parallel relationship with the teeth of one roll projecting into the spaces between the rings of teeth of the other to define a zone of interpenetration, driving means for positively driving said pairs of stripper rolls so that in the zone of interpenetration the surfaces of the rolls are moving in the same direction as the inner portions of the carrier members in said passage, and cob discharging means, including a cob discharging roll having a relatively yielding surface and mounted for rotation cross-wise in said frame in close proximity to the stripper assembly, and elevator means mounted on the chassis and having a portion extending below the cob discharging roll.

2. A maize harvesting machine comprising a chassis having a rear end and a forward end, an inclined frame-work secured to one side of the chassis in a rearwardly and upwardly sloping position with respect to said chassis, plant conveyor and gripper means and stripping means including cob discharging means mounted in said frame, said conveyor means comprising a pair of endless carrier means having inner portions and outer portions and defined between upper and lower band portions, a plurality of gripper members of curved cross-section mounted in parallel spaced relationship on one of said carrier means, a second plurality of gripper members of curved cross-section mounted in parallel spaced relationship on other of said carrier means, a relatively rigid outwardly projecting arm mounted on the lower band portion of each carrier means between each pair of gripper members, the inner portions of the two carrier members being spaced width-wise of the frame to define a passage, said gripper members being arranged so that in said passage their concave sides face forwardly, and their edges remote from the carrier members are in plant gripping relationship, driving means adapted positively to drive said carrier means so that the inner portions move upwardly and rearwardly, a stripper assembly arranged in the frame rearwardly of said passage and comprising two pairs of stripper rolls, said stripper rolls including a body portion and a plurality of circumferential rings of teeth of diameter larger than said body portion, said rings of teeth being arranged in spaced relationship along said body portion, the stripper rolls of a pair being disposed in parallel relationship with the teeth of one roll projecting into the spaces between the rings of teeth of the other to define a zone of interpenetration, driving means for positively driving said pairs of stripper rolls so that in the zone of interpenetration the surfaces of the rolls are moving in the same direction as the inner portions of the carrier members in said passage, and cob discharging means, including a cob discharging roll having a relatively yielding surface and mounted for rotation cross-wise in said frame in close proximity to the stripper assembly, and elevator means mounted on the chassis and having a portion extending below the cob discharging roll.

3. A maize harvesting machine comprising a chassis having a rear end a forward end, an inclined framework secured to one side of the chassis in a rearwardly and upwardly sloping position, plant lifter means at the forward end of said framework, including a structure hingedly mounted to the framework and comprising a ground member and a forwardly concave riser meeting said ground member at one end to form a nose, plant conveyor and gripper means and stripper means including cob discharging means mounted in said frame, said conveyor means comprising an endless belt mounted to be driven around a pair of rollers rotatably mounted to one side in said framework and spaced lengthwise thereof, the axes of said rollers being perpendicular to the slope of said frame, a plurality of gripper members of a resilient material and of curved cross-section mounted in parallel spaced relationship on said belt to form a series extending lengthwise of said belt each unit of which is located crosswise thereof, a second endless belt mounted to be driven around a second pair of rollers, said second belt being positioned in parallel spaced relationship to said first belt in said framework, a plurality of gripper means of resilient material, each mounted crosswise of the second belt in parallel relationship and spaced lengthwise of the second belt, each belt having an inner portion, said inner portion defining a passage extending lengthwise of the framework, said gripper members being so arranged that in said passage their concave surfaces face forwardly and their edges remote from the belts are in plant gripping relationship, a plurality of relatively rigid arms interspersed among the gripper members and projecting outwardly from the lower edges of said belts, driving means adapted positively to drive said belts so that the inner portions move upwardly and rearwardly, a cutter positioned rearwardly of the forward end of the conveyor means a stripper assembly arranged in the framework rearwardly of said passage and comprising two pairs of stripper rolls, said stripper rolls including a body portion and a plurality of circumferential rings of teeth of diameter larger than said body portion, said rings of teeth being spaced along said body portion, the stripper rolls of a pair being disposed in parallel relationship with the teeth of one roll projecting into the spaces between the rings of teeth of the other roll to define a stripping zone, the two pairs of rolls being arranged in close side by side relationship crosswise of the frame with their axes perpendicular to the slop of the frame, to define a zone of proximity, a diverting member mounted for free rotation parallel to said stripper rolls just forwardly of said zone of proximity, driving means for positively driving said pairs of stripper rolls so that in the zone of interpenetration the surfaces of the rolls are moving in the same direction as the inner portion of the carrier members in said passage, and cob discharging means including a cob discharging roll having a relatively yielding surface and mounted for rotation crosswise in said frame in close proximity to the stripper assembly, and elevator means mounted on the chassis and having a portion extending below the cob discharging roll, and a rising portion terminating at a hopper, and final de-husking rollers mounted in said hopper in parallel side by side relationship, the axes of said de-husking rollers being inclined downwardly and away from said upper elevator portion.

4. In a maize harvesting machine of the type described comprising conveyor means including gripper means, a gripper member of curved cross section anchored at one straight edge to the conveyor means and having at least its free edge opposite to said anchored edge composed of resilient material said free edge having a lower portion substantially parallel to the anchored edge and an upper cut away portion, whereby when two such gripper members are brought into plant gripping relationship with the lower portions of their free edges in engagement a gap is provided immediately above the engaged lower portions to accommodate a plant stem.

5. A maize harvesting machine comprising a chassis, a pair of spaced, vertical endless conveying members arranged in opposed parallel inclined relationship and defining therebetween an inclined passage extending from a lower portion, near the front of the machine, upwardly toward the rear of the machine, means for uniformly driving said conveying members so that the inner runs thereof, defining said passage, move toward the rear of the machine, and a plurality of yieldable, laterally extending gripping members fixed upon the outer sides of both said conveying members, the said gripping members being adapted to coact with maize entering said passage whereby to carry said maize upwardly and rearwardly of the machine.

6. A maize harvesting machine according to claim 5, further characterized in that the said conveying members are flat belts and the said gripping members are disposed crosswise of said belts.

7. A maize harvesting machine according to claim 5, further characterized in including a cutter adapted to cut the maize substantially as it enters the said passage and a plurality of laterally projecting, relatively rigid arms fixed upon the said conveying members at points along lower portions thereof and adapted to engage such entering maize and press it into engagement with said cutter and to thereafter assist in supporting the maize in its movement through said passage.

8. A maize harvesting machine according to claim 5, further characterized in including a pair of coacting, oppositely driven stripping rolls disposed adjacent the rear end of said passage and working about parallel axes which are angular to the line of movement of the maize through said passage.

9. A maize harvesting machine according to claim 5, further characterized in including two pairs of coacting, oppositely driven stripping rolls disposed adjacent the rear end of said passage and working about parallel axes which are angular to the line of movement of the maize through said passage, and a diverting member disposed between said two pairs of stripping rolls at the receiving side thereof and adapted to divert maize toward one or the other of said pairs of rolls.

10. A maize harvesting machine according to claim 5, further characterized in including two pairs of coacting, oppositely driven stripping rolls disposed adjacent the rear end of said passage and working about parallel axes which are angular to the line of movement of the maize through said passage, and a diverting member disposed between said two pairs of stripping rolls at the receiving side thereof and adapted to divert maize toward one or the other of said pairs of rolls, the said diverting member comprising a smooth cylindrical roll, freely rotatable about an axis which is parallel to the axes of the said stripping rolls.

11. A maize harvesting machine according to claim 5, further characterized in including a pair of coacting, oppositely driven stripping rolls disposed adjacent the rear end of said passage and working about parallel axes which are angular to the line of movement of the maize through said passage, and a driven cob discharging roll of yielding material disposed adjacent the receiving side of said stripping rolls toward a lower end thereof and adapted to force a cob between it and the adjacent end portions of said stripping rolls whereby to aid in removing the husk from said cob.

12. In a maize harvesting machine having means for cutting maize or the like and for conveying cut stalks thereof to a processing station in said machine; means for stripping cobs from stalks and husks from cobs, comprising a pair of coacting, oppositely driven stripping rolls adapted to engage a cut stalk and draw the latter therebetween from a feed side of said rolls to a discharge side thereof, the said stripping rolls having a sufficiently small clearance therebetween that cobs may not pass between said rolls whereby the cobs are separated from the stalks; the said rolls, further, having roughened surfaces adapted to engage and remove the husks from said cobs.

13. Stripping means according to claim 12, further characterized in having two pairs of said stripping rolls arranged alongside each other, and a diverting member disposed between said two pairs of stripping rolls at the feed side thereof and adapted to divert maize toward one or the other of said pairs of rolls.

14. Stripping means according to claim 12, further characterized in having two pairs of said stripping rolls arranged alongside each other, and a diverting member disposed between said two pairs of stripping rolls at the feed side thereof and adapted to divert maize toward one or the other of said pairs of rolls, the said diverting member comprising a smooth, freely rotatable cylindrical roll.

15. Stripping means according to claim 12, further characterized in including a driven cob discharging roll of yielding material disposed adjacent the receiving side of said stripping rolls toward a lower end thereof and adapted to force a cob between it and the adjacent end portions of said stripping rolls whereby to aid in removing the husk from said cob.

SIMON BELFER.